US012676815B2

(12) United States Patent (10) Patent No.: US 12,676,815 B2

Mealiffe et al. (45) Date of Patent: Jul. 7, 2026

(54) SYSTEM FOR DISAMBIGUATING COMPOSITE EGRESS TRAFFIC FOR ROUTING AND OTHER CONTROL

(71) Applicant: Microsoft Technology Licensing, LLC, Redmond, WA (US)

(72) Inventors: Jeffrey Kramer Mealiffe, Seattle, WA (US); Pengfei Cui, Suzhou (CN); Konstantin Ryvkin, Bellevue, WA (US); Rajesh Maskara, Seattle, WA (US); Qing Wei, Suzhou (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/687,128

(22) PCT Filed: Jun. 1, 2022

(86) PCT No.: PCT/CN2022/096585

§ 371 (c)(1),
(2) Date: Feb. 27, 2024

(87) PCT Pub. No.: WO2023/230953

PCT Pub. Date: Dec. 7, 2023

(65) Prior Publication Data

US 2024/0356844 A1 Oct. 24, 2024

(51) Int. Cl.
H04L 45/74 (2022.01)
H04L 9/40 (2022.01)

(52) U.S. Cl.
CPC ............ H04L 45/74 (2013.01); H04L 63/083 (2013.01)

(58) Field of Classification Search
CPC . H04L 41/12; H04L 61/5038; H04L 61/2575; H04L 2101/622; H04W 4/029; H04W 4/02
See application file for complete search history.

(56) References Cited

U.S. PATENT DOCUMENTS

| | | | | |
|---|---|---|---|---|
| 2016/0142875 A1* | 5/2016 | Awoniyi-Oteri | ........ | H04M 3/56 455/456.2 |
| 2016/0149775 A1* | 5/2016 | Cheung | .................... | H04L 67/52 709/224 |
| 2020/0252400 A1* | 8/2020 | Pike | ........................ | G06F 21/42 |
| 2021/0399959 A1 | 12/2021 | Barry et al. | | |
| 2022/0394104 A1* | 12/2022 | Fieremans | .............. | H04L 67/52 |

FOREIGN PATENT DOCUMENTS

EP  3000051 A1  3/2016

OTHER PUBLICATIONS

International Search Report and Written Opinion Issued in PCT Application No. PCT/CN2022/096585, mailed on Nov. 23, 2022, 11 Pages.

* cited by examiner

*Primary Examiner* — Chirag R Patel

(74) *Attorney, Agent, or Firm* — Schwegman Lundberg & Woessner, P.A.

(57) ABSTRACT

An egress traffic disambiguation system receives a request with source egress location metadata identifying the source egress location. The source egress location can include authentication context data and local area subnetwork identifying metadata. The egress traffic disambiguation system disambiguates the source location of the request and provides the source location to a traffic data aggregation system which aggregates the request to the identified source location.

14 Claims, 12 Drawing Sheets

SYSTEM FOR DISAMBIGUATING COMPOSITE EGRESS TRAFFIC FOR ROUTING AND OTHER CONTROL

CROSS-REFERENCE TO RELATED APPLICATION

The present application is a Section 371 National State Application of and claims priority of International Patent Application Serial No. PCT/CN2022/096585, filed Jun. 1, 2022, the content of which is hereby incorporated by reference in its entirety.

BACKGROUND

Computer systems are currently in wide use. Some computer systems host services or other applications that can be accessed by tenant computing systems.

Some computer system infrastructure providers obtain application experience metrics, such as network latency (the latency experienced by an end user accessing the service or application) and other metrics, and attempt to aggregate the metrics to branch locations for individual tenants. The metrics can be generated by analyzing inbound requests to a hosted service or application in order to identify a variety of different parameters or metric values corresponding to such a request.

The computer system infrastructure providers, or other systems, can then generate control signals based on the aggregated metrics in order to improve the end user experience with the service or application that is being accessed.

In order for the metrics to be most useful, the actual source location which originated the request (the geographic location as well as the network location) is to be identified so that the metrics can be aggregated over different individual source locations. Some current methods of determining the physical and/or network location where the request originated is to determine the physical egress location of the network traffic by using the source internet protocol (IP) address of the device that placed the request on the network as a key to identifying that location. The source IP address can be used as a key against a database which has been populated based on known customer configurations or against a geographic IP dataset.

The discussion above is merely provided for general background information and is not intended to be used as an aid in determining the scope of the claimed subject matter.

SUMMARY

An egress traffic disambiguation system receives a request with source egress location metadata identifying the source egress location. The source egress location can include authentication context data and local area network (LAN) subnetwork identifying metadata. The egress traffic disambiguation system disambiguates the source location of the request and provides the source location to a traffic data aggregation system which aggregates the request to the identified source location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
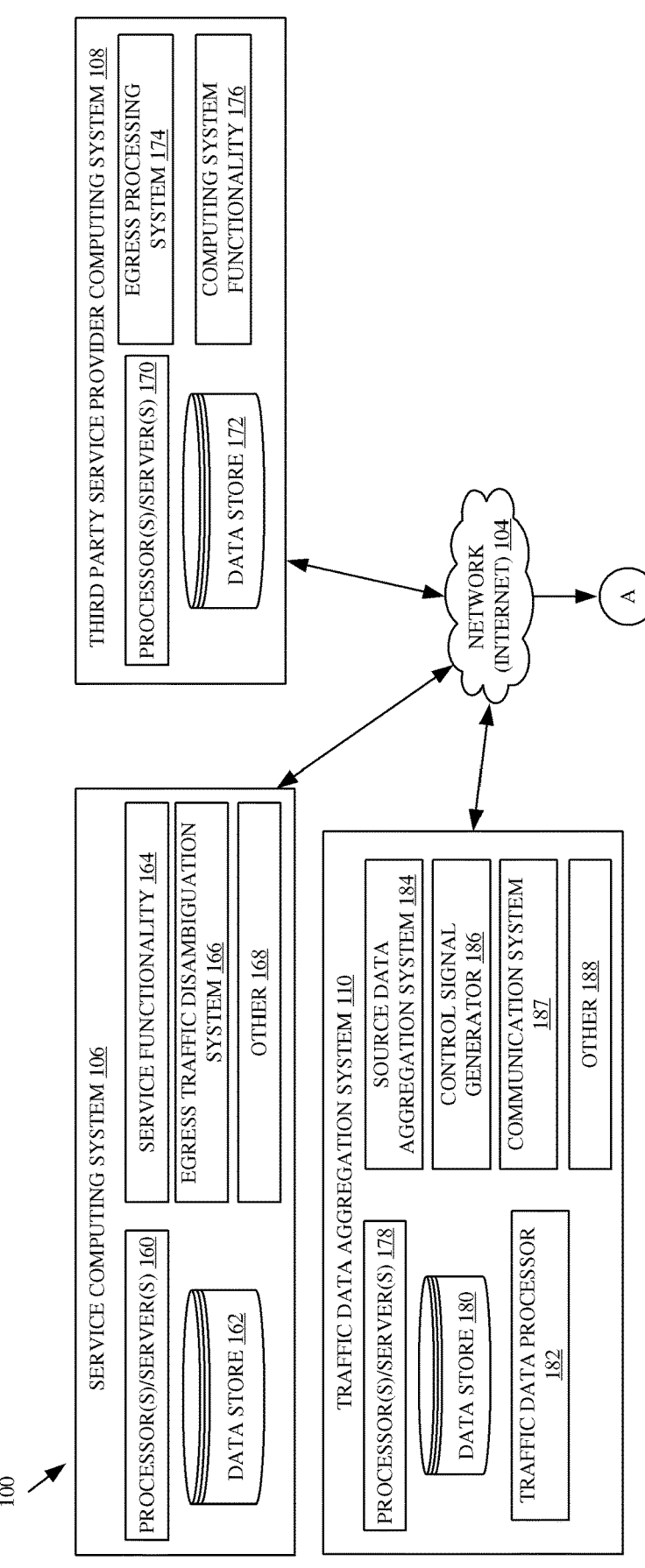
FIGS. 1A and 1B (collectively referred to herein as FIG. 1) show a block diagram of one example of a computing system architecture.

As discussed above, some systems attempt to compare metrics and/or scores based on received requests and then aggregate those metrics and/or scores to the location where the request originated (the source location). In order to aggregate a metric and/or scores to the source location, the actual source location of the request is to be determined. Some current methods that attempt to identify the source location use the source IP address of the egress location to search a database which has been populated based on known customer configurations or to search a geographic IP dataset. Where the tenant network topologies are trivial or simple, the source IP address of the egress location indicates the source location of the request with reasonable accuracy. However, as the tenant topology and internal complexity of the tenant network increases, the accuracy of using the source IP address of the egress location to identify the physical source location of network traffic becomes less accurate.

For example, some current enterprise networks include branch locations that are all connected to one of a plurality of different regional data centers. The branch locations backhaul network traffic to one or more of the regional data centers where traffic is processed prior to egress on to the internet. For instance, the regional data center may perform security or other processing on the request before the request is sent on to the internet. In such a scenario, once the recipient service (which is the recipient of the traffic) receives the request, the service only sees a collection of source IP addresses which represent the regional data center which was the last hop in the tenant topology prior to the request being placed on the internet. Thus, the recipient service cannot determine which of the branch locations originated the traffic.

In another scenario, the request may be sent to a third party intermediate service prior to being sent to the recipient service. For instance, the regional data center in the tenant computing system architecture may send the request to a third party security system which performs the security processing or other processing on the request, prior to sending the request over the internet to the recipient service. In such a scenario, the recipient service will now receive requests from multiple different tenants (who all use the third party intermediate service) coming from the same IP address (which is the address of the egress processing system on the third party intermediate service).

In the above scenario, it is difficult to aggregate any metrics and/or scores corresponding to a request to the source location of the request. This is because the IP address of the egress location does not correspond to the source location where the request was generated.

The present description thus describes a system which uses a client component to generate location information indicative of the physical and/or network location of the subnetwork from which the request originates. The location information can be used as disambiguation metadata for disambiguating the source location of the request. That disambiguation metadata is then placed in the request (such as in the http header of the request) so that when the recipient service eventually receives the request, the recipient service will be able to use the disambiguation metadata to identify the physical and/or network location which is the source of that request. In one example, the disambiguation metadata includes authentication metadata (which may include a tenant identifier) as well as local area network (LAN) context information (such as the IP address of the source LAN subnet within the tenant computing system architecture). In another example, the client functionality can access an application programming interface (API) exposed by an egress traffic disambiguation system. The client functionality may make an API call providing the disambiguation metadata and, in turn, be assigned a unique identifier. Then, in subsequent calls, the client functionality places that unique identifier as disambiguation metadata in the request or sends the disambiguation metadata in another predefined way (such as in the hypertext transfer protocol-http-header or other predefined location in the request or through a dedicated information channel, etc.). In either scenario, the disambiguation system accesses the disambiguation metadata in subsequent requests to identify the origin or source of the request within a tenant computing system architecture topology. The disambiguation system can do this by accessing predefined tenant configuration information or in other ways.

Figure 1B:
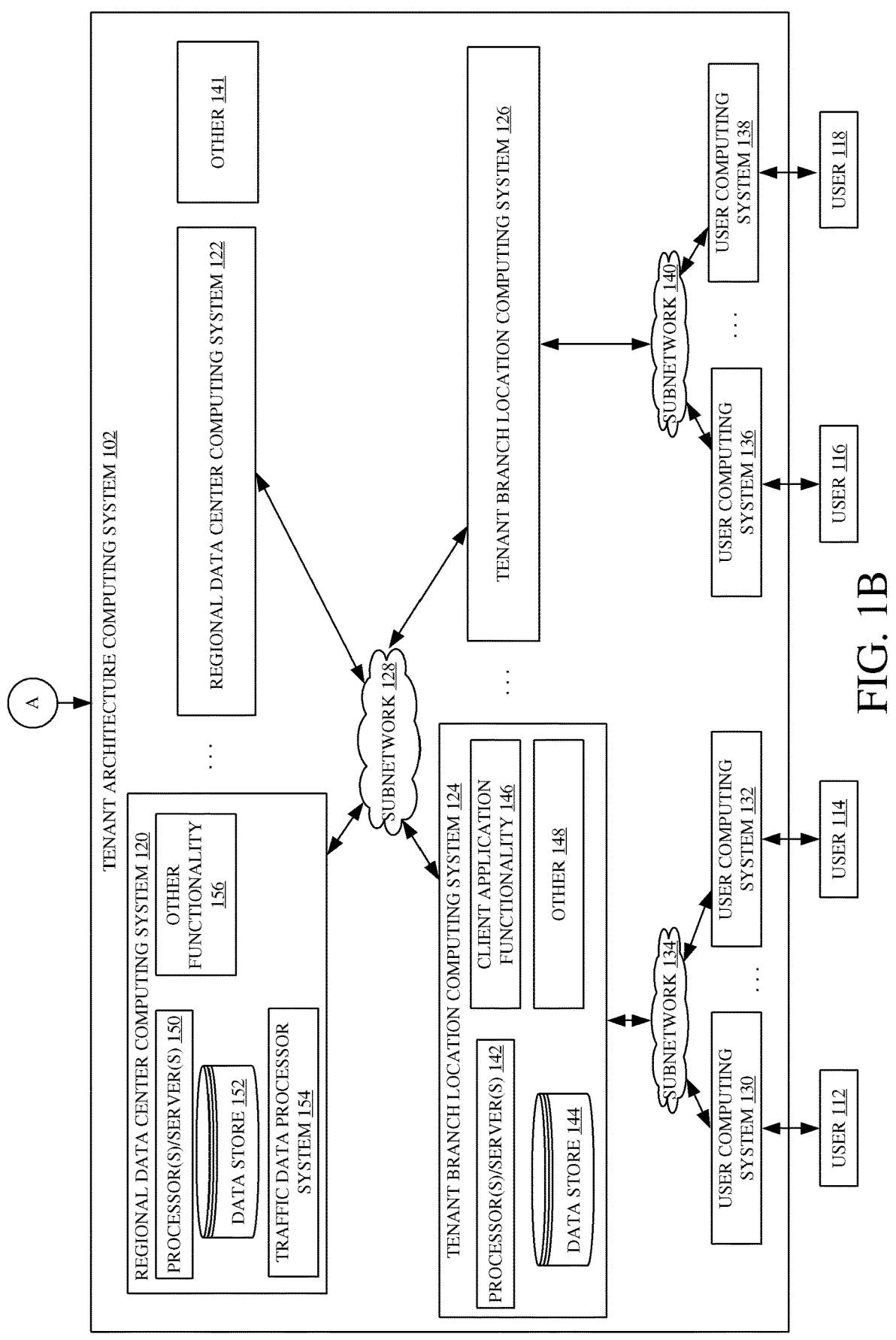

FIGS. 1A and 1B (collectively referred to herein as FIG. 1) show a block diagram of one example of a computing system architecture 100 in which a tenant computing system architecture 102 is connected through network 104 to a service computing system 106. Tenant computing system architecture 102 is also connected to third party service provider computing system 108 over network 104. Traffic data aggregation system 110 is connected to network 104 as well.

FIG. 1 also shows that a plurality of different users 112, 114, 116, and 118 use tenant computing system architecture 102. Tenant computing system architecture 102 has a plurality of regional data center computing systems 120-122. The regional data center computing systems 120-122 are connected to tenant branch location computing systems 124-126 over a subnetwork 128. User computing systems 130-132 are connected to tenant branch location computing system 124 over subnetwork 134. Similarly, user computing systems 136-138 are connected to tenant branch location computing system 126 over subnetwork 140. Tenant computing system architecture 102 can include other items 141 as well.

Service computing system 106 hosts a service that is used by users 112-118 of tenant computing system architecture 102. When a user (e.g., user 112) wishes to access service computing system 106, user 112 interacts with user computing system 130 to generate a request that is provided to service computing system 106 through various subnetworks. The request is provided from user computing system 130 to tenant branch location computing system 124 over subnetwork 134. Tenant branch location computing system 124 backhauls the request to regional data center computing system 120 through network 128. Regional data center computing system 120 performs processing on the request and then provides it through a gateway device to network 104, which may be the internet or another wide area network or other network or combination of networks. In one example, the request is first provided to third party service provider computing system 108 for further processing prior to being provided to service computing system 106.

Traffic data aggregation system 112 obtains information indicative of where each request to service computing system 106 originated so that traffic data can be aggregated back to the particular tenant branch location computing system 124 where the request originated. Traffic data aggregation system 110 can perform analysis and other processing on the aggregated data to generate metrics or scores indicative of a user's experience in using the service hosted by service computing system 106. The metrics or scores can be used to generate control signals for controlling various items in architecture 100. It can be seen in architecture 100 that if service computing system 106 receives the request from third party service provider computing system 108, it can be very difficult to identify the particular tenant branch location computing system 124 (or user computing system 130) which originated the request. Therefore, as is described in more detail below, client application functionality that either resides on the tenant branch location computing systems 124-126 or the user computing systems 130-138 identifies disambiguation metadata (such as the IP address of the particular subnetwork 128 or 134 or 140 where the request originates) and places that disambiguation metadata into a metadata portion of the request (such as the http header of the request). Service computing system 106 can then identify, from that disambiguation metadata, where the request was originated (the source location of the address) and provide that information to traffic data aggregation system 110. In one example, the tenant computing system architecture 102 first provides a representation of its topology to service computing system 106 so that service computing system 106 can match the IP address in the metadata portion of the request (which may be an internal IP address that is internal to tenant computing system architecture 102) to the particular tenant branch location computing system 124-126 or user computing system 130-138 that originated the request.

In another scenario, each of the tenant branch location computing systems 124-126 (and in another example the user computing systems 130-138) provide the IP address of the subnetwork which it uses to service computing system 106. The service computing system 106 then provides a unique identifier for that subnetwork back to the item (tenant branch location computing system 124-126 and/or user computing system 130-138) that provided the IP address. The requesting system then uses that unique identifier each time a request is generated, and service computing system 106 matches the unique identifier to the particular subnetwork where the request was generated. Before describing the overall operation of architecture 100 in more detail, a description of some of the items in architecture 100, and their operation, will first be provided.

Each of the user computing systems 130-138 includes a processor or server and a data store, as well as user computing system functionality, including interface functionality that generates interfaces for interaction by the corresponding users 112-118. Subnetworks 134 and 140 may include local area networks or other networks through which user computing systems 130-138 connect to the corresponding tenant branch location computing systems 124-126.

The tenant branch location computing systems 124-126 can be similar or different. It is assumed for the sake of the present discussion that they are similar so that only tenant branch location computing system 124 is described in more detail. Tenant branch location computing system 124 illustratively includes one or more processors or servers 142, data store 144, client application functionality 146, and other items 148. In one example, the client application functionality 146 may be a client component of the service hosted by service computing system 106, or functionality 146 can be different functionality. While the present discussion proceeds with respect to client application functionality 146 residing on tenant branch location computing system 124, functionality 146 could reside also, or instead, on the user computing systems 130-132 or elsewhere, or functionality 146 could be distributed among a variety of the illustrated computing systems or other systems.

In one example, the client application functionality 146 has functionality that identifies the metadata corresponding to the location where a request is generated and placing that request in the metadata portion of the request (such as in the http header of the request or a dedicated information channel, etc.). Thus, client application functionality 146 can reside on tenant branch location computing system 124 or user computing systems 130-132, or both. Tenant branch location computing system 124 has functionality for communicating over subnetwork 128 with one or more of the regional data center computing systems 120-122.

The regional data center computing systems 120-122 can also be similar or different. It is assumed that they are similar for the sake of the present discussion so that only regional data center computing system 120 will be described in more detail. Also, in one example, it may be that one of the regional data center computing systems 120-122 serves traffic generated from a subset of the tenant branch location computing systems 124-126. Therefore, in the present example, it is assumed that requests that are generated by tenant branch location computing system 124 are backhauled through subnetwork 128 to regional data center computing system 120, while the requests generated through tenant branch location computing system 126 are backhauled through subnetwork 128 to regional data center computing system 122. Therefore, the regional data center computing systems 120-122 contain the gateway egress devices that place the requests that they service on the network 104.

In the present example, regional data center computing system 120 includes one or more processors or servers 150, data store 152, traffic egress processing system 154, and system 102 can include a wide variety of other functionality 156 as well. Traffic egress processing system 154 can perform processing on requests received from tenant branch location computing system 124 and place the processed requests on network 104.

Third party service provider computing system 108 may include one or more processors or servers 170, data store 172, egress processing system 174, and a wide variety of other computing system functionality 176. Computing system functionality 176 can receive requests from tenant computing system architecture 102 and egress processing system 174 can perform the processing on those requests prior to sending them to service computing system 106. For instance, egress processing system 174 can perform security processing on the request before it is sent to service computing system 106. Other processing can be performed as well. Egress processing system 174 also illustratively includes a device, such as a router or other default gateway device, that places the request on the network 104, after the processing is done.

Service computing system 106 may include one or more processors or servers 160, data store 162, service functionality 164, egress traffic disambiguation system 166, and a wide variety of items 168. Service functionality 164 may expose an interface that can be accessed by tenant computing system architecture 102 to obtain services. The API may receive requests from architecture 102 that request services from service computing system 106.

Egress traffic disambiguation system 166 accesses the disambiguation metadata in the requests that identifies the source location (e.g., the source subnetwork) of the request. Egress traffic disambiguation system 166 processes the disambiguation metadata to obtain the identity of the source location from which the request originated, and provides that identity to traffic aggregation system 110.

Traffic data aggregation system 110 can includes one or more processors or servers 178, data store 180, traffic data processor 182, source data aggregation system 184, control signal generator 186, communication system 187, and other items 188. Traffic data processor 182 receives the information from egress traffic disambiguation system 166 that identifies the source of one or more requests. Traffic data processor 182 provides the source information to source data aggregation system 184 which aggregates the data to the particular source from which it was received in order that traffic metrics and/or scores may be calculated. Control system 184 can generate a variety of different metrics, scores, etc. that are provided to control signal generator 186. Control signal generator 186 generates control signals based upon those metrics and scores. Control signal generator 186 can generate a control signal to control communication system 187 to surface the metrics and traffic data for users, engineers, etc. In another example, control signal generator 186 can generate routing control signals to control routing or to otherwise control traffic bandwidth on certain networks and subnetworks. Other control signals can be generated as well.

Figure 2:
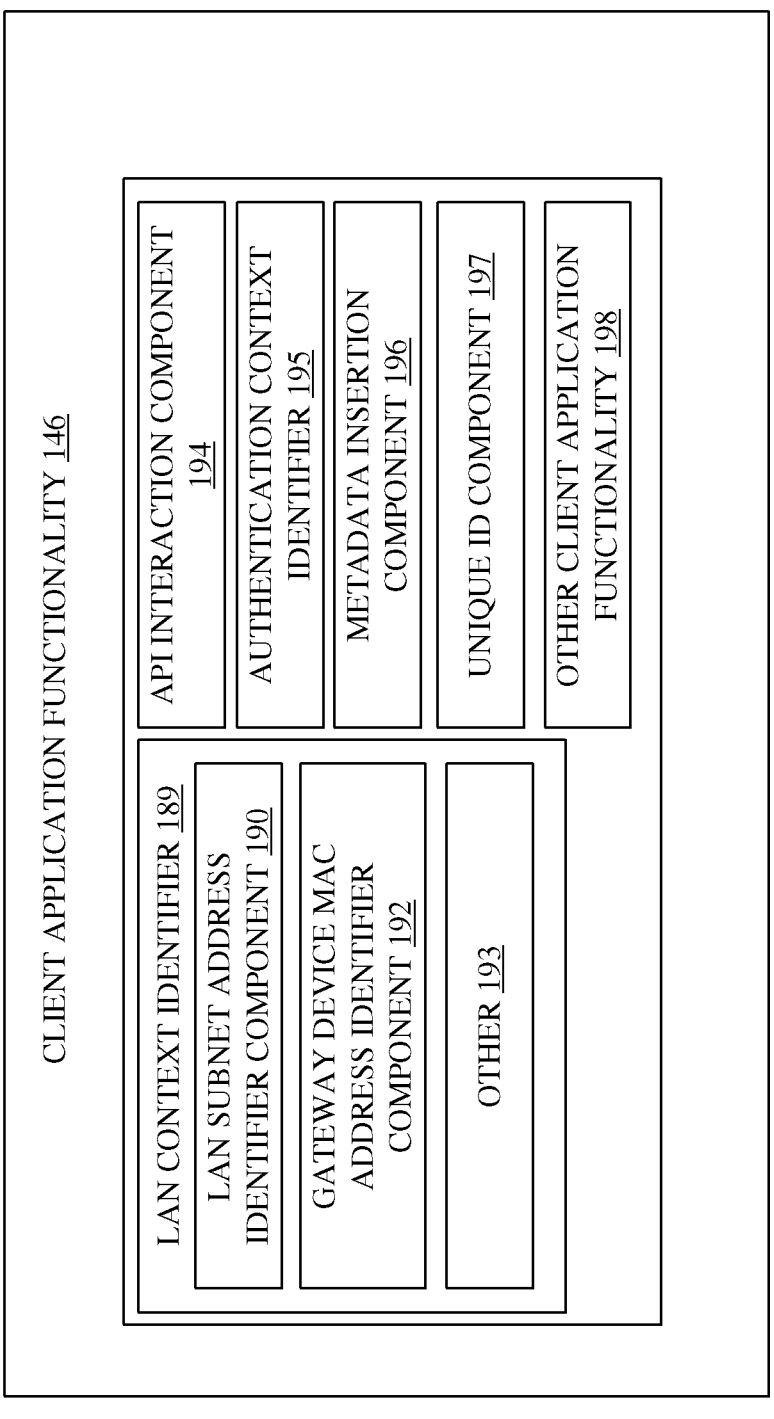
FIG. 2 is a block diagram showing one example of client application functionality.

FIG. 2 is a block diagram showing one example of client application functionality 146 in more detail. Client application functionality 146 can include local area network (LAN) context identifier 189 which can, itself, include LAN subnet address identifier component 190, gateway device MAC address identifier component 192, and other items 193. Functionality 146 can also include authentication context identifier 195, unique ID component 197, API interaction component 194, metadata insertion component 196, and other client application functionality 198. LAN context identifier 189 obtains LAN context information that can be used to disambiguate the address of the source location of a request. LAN subnet address identifier component 190 identifies the LAN subnet address on the subnetwork where the originating computing system generates the request. For instance, component 190 may be logic that queries the address from a router or other device to obtain a subnet IP address. Gateway device MAC address identifier component 192 identifies the MAC address of the default gateway device that is used to egress the request onto the internet or onto another network. Again, component 192 may be logic that queries that device for its IP address each time a request is generated. LAN context identifier 189 can obtain other local area network context information using other functionality 193 as well. Authentication context identifier 195 can obtain an authentication context where authentication is performed by a third party service provider computing system 108, for instance. The authentication context identifier 195 may, for example, identify the tenant identifier (tenant ID) in a token that is used for authentication. The authentication context identifier 195 can identify authentication context in other ways as well.

API interaction component 194 illustratively interacts with the API exposed by egress traffic disambiguation system 166 in a scenario in which the client application functionality 146 is obtaining a unique identifier that can be used with subsequent requests. Unique ID component 197 can be used when a request is generated to obtain the unique ID for insertion in the request.

Metadata insertion component 196 inserts the disambiguation metadata (the LAN subnet address, the gateway device MAC address, the authentication context, the unique identifier, and/or other information) into the request so that it can be later extracted and processed by egress traffic disambiguation system 166 (shown in FIGS. 1 and 3). For instance, component 196 can insert the disambiguation metadata in the http header of the request or elsewhere.

Figure 3:
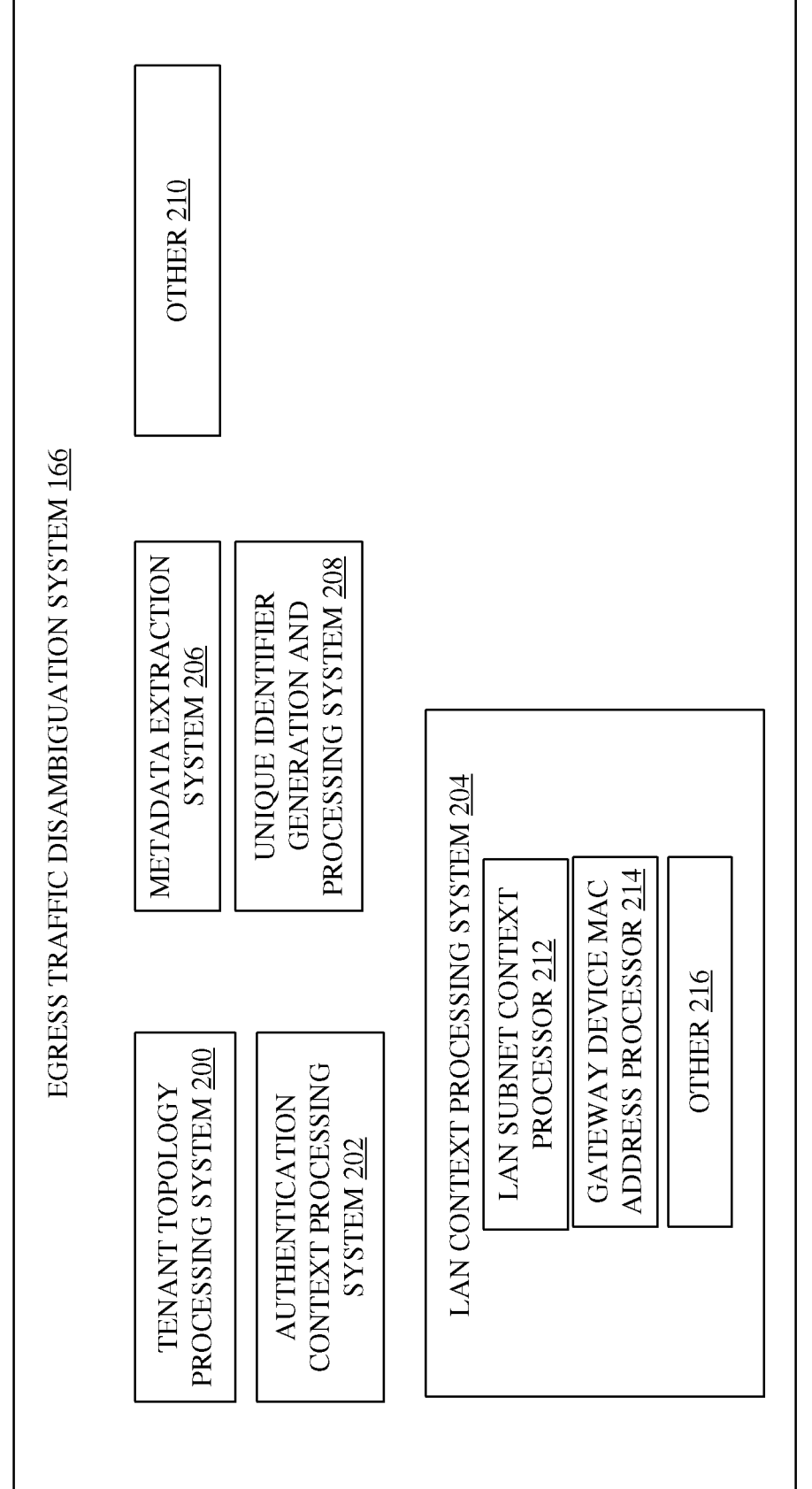
FIG. 3 is a block diagram showing one example of an egress traffic disambiguation system.

FIG. 3 is a block diagram showing one example of egress traffic disambiguation system 166 in more detail. Egress traffic disambiguation system 166 can include tenant topology processing system 200, authentication context processing system 202, LAN context processing system 204, metadata extraction system 206, unique identifier generation and processing system 208, and other items 210. Metadata extraction system 206 extracts the disambiguation metadata from the received request. The metadata extraction system 206 may identify the disambiguation metadata at a predefined location (such as in the http header or elsewhere), or identify the disambiguation metadata in other ways.

LAN context processing system 204 can include LAN subnet context processor 212, gateway device MAC address processor 214, and other items 216. Tenant topology processing system 200 receives a representation of the topology of tenant computing system architecture 102. The topology indicates the location of the IP addresses of the subnetworks within architecture 102. Therefore, when egress traffic disambiguation system 166 receives metadata indicative of an IP address within a particular tenant, system 166 can compare the IP address against the tenant topology to identify the subnetwork location within that tenant topology corresponding to the IP address. The tenant topology can be received by manual input or automated input or in other ways. The tenant topology can be updated intermittently, periodically, based upon triggering events (such as detected changes in the topology, etc.), or in other ways.

Authentication context processing system 202 processes any authentication context metadata that is extracted. For instance, where the authentication metadata includes the tenant ID, that ID may be extracted and used to identify the particular tenant computing system architecture 102 from which the request originated.

LAN context processing system 204 processes any LAN context metadata contained in the request. The items of LAN context metadata can be used to disambiguate and locate the source of the request. LAN subnet context processor 212 identifies the LAN subnet IP address included in the disambiguation metadata and compares the LAN subnet IP address against the topology for the tenant to identify the location corresponding to the LAN subnet IP address. Gateway device MAC address processor 214 can obtain the default gateway device MAC address and compare that address to the stored topology of the tenant to identify the location of the default gateway device within the tenant.

Unique identifier generation and processing system 208 can be used to service requests for a unique identifier from components in tenant computing system architecture 102. For instance, in the scenario where a unique identifier is used, as the disambiguation metadata, to identify a particular subnet within a tenant, that subnet can provide its location information through the API to unique identifier generation and processing system 208 to obtain the unique identifier. The unique identifier for that subnet location can be returned by system 200. Then, when a subsequent request is received from that subnet location, unique identifier generation and processing system 208 can process the unique identifier (which will be included in the request as disambiguation metadata) to identify the location of origin of that request within a particular tenant topology.

Figure 4A:
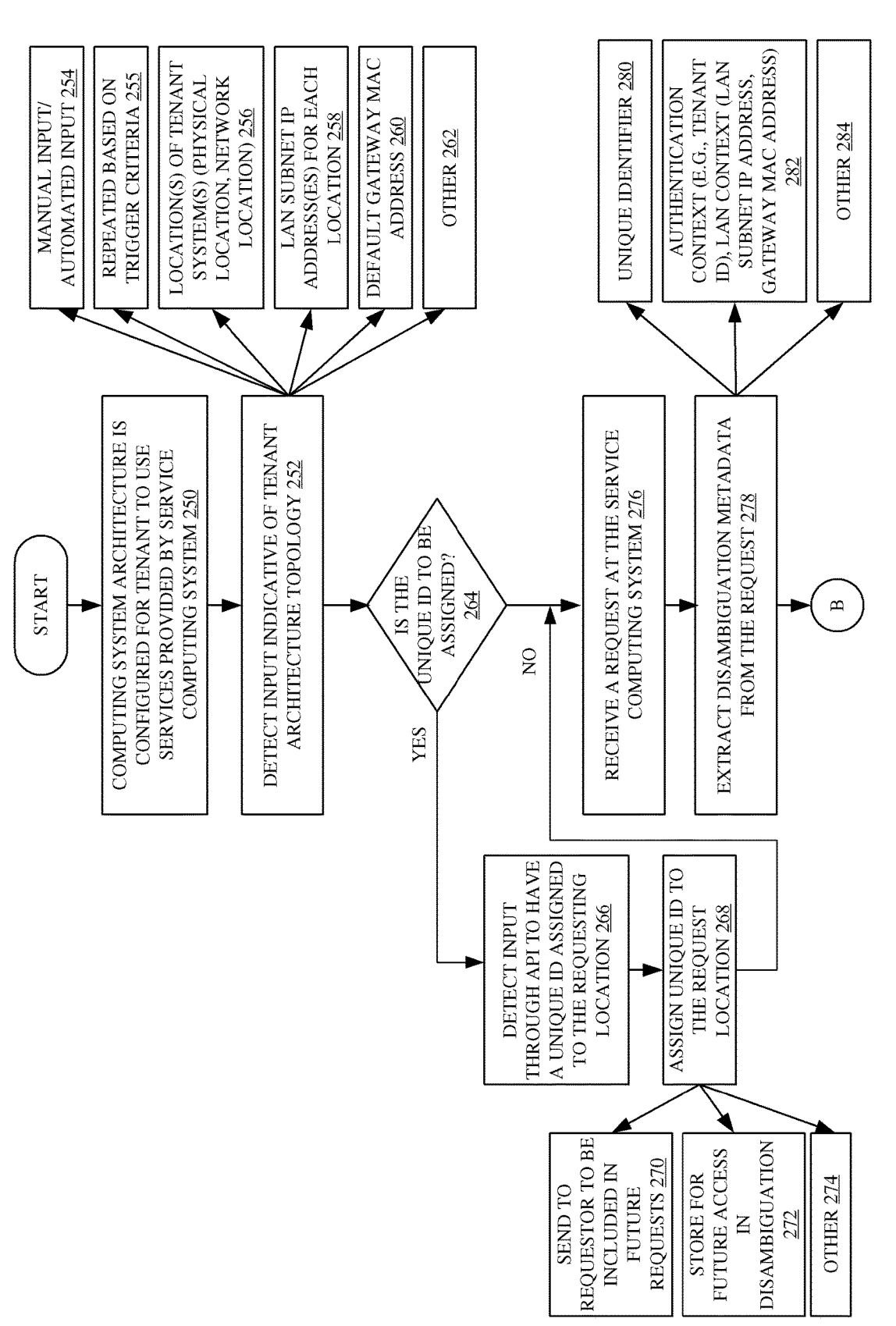
FIGS. 4A and 4B (collectively referred to herein as FIG. 4) show a flow diagram illustrating one example of the operation of a computing system architecture.
Figure 4B:
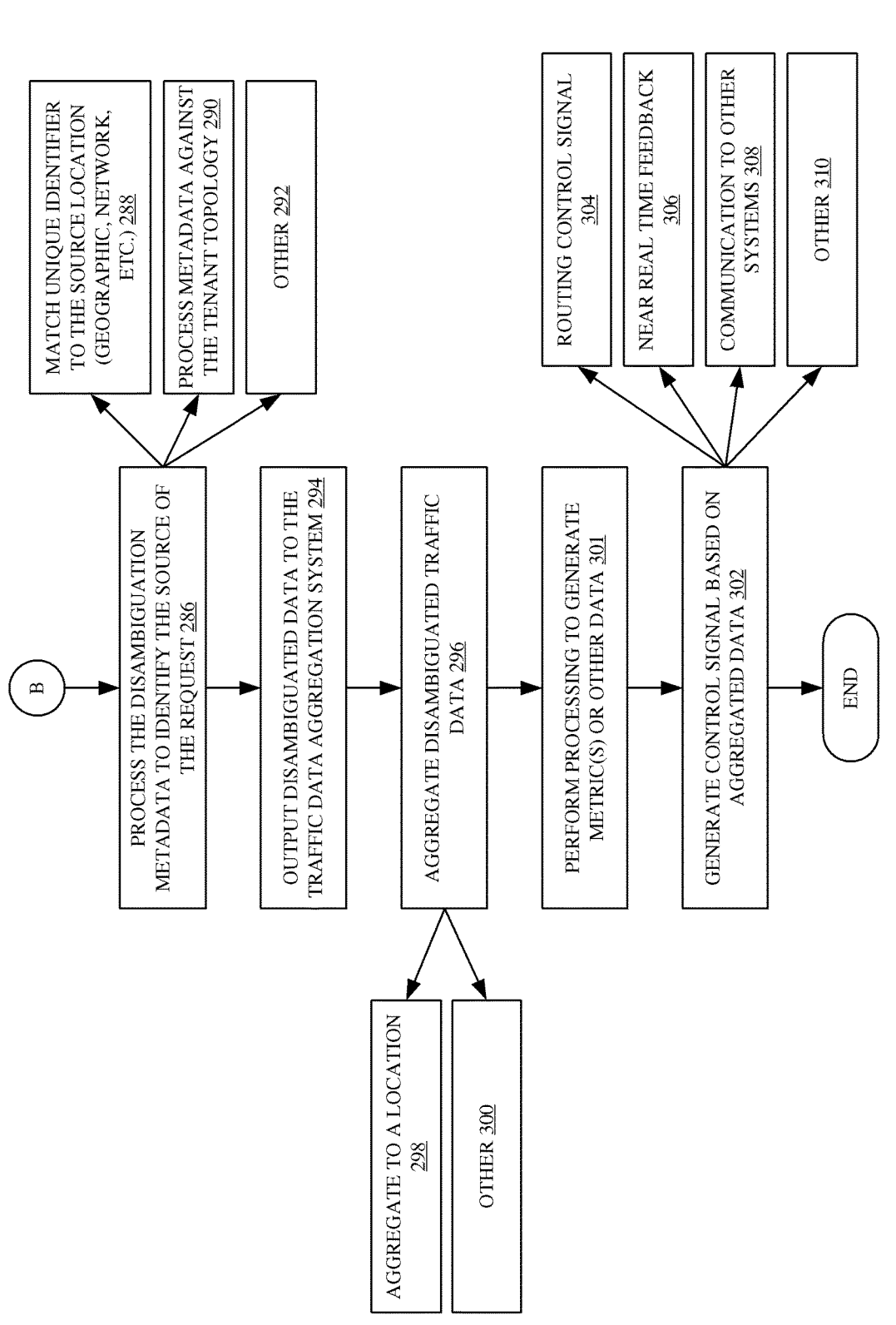

FIGS. 4A and 4B (collectively referred to herein as FIG. 4) show a flow diagram illustrating one example of the operation of architecture 100 shown in FIG. 1. It is first assumed that a computing system architecture is configured for a tenant architecture 102 to use a service provided by a service computing system 106. Such architecture is indicated by block 250 in the flow diagram of FIG. 4. Tenant topology processing system 200 then detects or otherwise receives an input indicative of the tenant architecture topology, as indicated by block 252. An indication of the tenant topology can be received based on a manual input or an automated input or in other ways as indicated by block 254. The indication of the tenant topology identifies the locations of the tenant systems, where service requests can originate, in terms of the physical location, the network location, etc., as indicated by block 256. The topology identifies the LAN subnet IP addresses for each location, as indicated by block 258. The topology may also identify the default gateway MAC address in the tenant as indicated by block 260. The representation of the topology can include a wide variety of other information as well, as indicated by block 262.

Egress traffic disambiguation system 166 then determines whether the client is to use the unique identifier in which case the unique identifier is to be assigned to each of the locations within the tenant topology. Determining whether the unique identifier is to be used is indicated by block 264 in the flow diagram of FIG. 4. If so, unique identifier generation and processing system 208 exposes an interface and detects an input through that interface to have a unique identifier assigned to any location within the tenant topology that wishes to have a unique identifier assigned. Detecting such an input is indicated by block 266 in the flow diagram of FIG. 4.

In response to that input, system 208 assigns a unique identifier to identify the location within the tenant topology, as indicated by block 268. The unique identifier can be mapped to the location within the tenant and stored for later access by egress traffic disambiguation system 166. The unique identifier can also be sent to the location in the tenant topology that requested it so that it can be included, as disambiguation metadata, in future requests to service computing system 106, as indicated by block 270. The unique identifier can be stored at the location that requested it for future access to perform disambiguation as indicated by block 272. For instance, the unique identifier can be stored in client application functionality 146, which may be stored on the subnetworks or at the branch locations 124-126 or at the user computing system locations 130-138, etc. The unique identifier can be assigned and stored in other ways as well, as indicated by block 274.

Once the tenant topology has been received by egress traffic disambiguation system 166 and/or the unique identifiers have been assigned, then egress traffic disambiguation system 166 is ready to disambiguate the source location where service requests provided to service computing system 106 originate. Therefore, the service computing system 106 receives a request, as indicated by block 276 in the flow diagram of FIG. 4. Metadata extraction system 206 extracts the disambiguation metadata from the request as indicated by block 278. As discussed above, the disambiguation metadata may be the unique identifier 280 assigned to the location that generated the request or it may include the authentication context information and LAN context information 282. The disambiguation metadata may include other items 284 as well.

Egress traffic disambiguation system 166 then processes the disambiguation metadata to identify the source location from which the request came, as indicated by block 286 in the flow diagram of FIG. 4. In one example, where a unique identifier is provided with a request, then unique identifier generation and processing system 208 matches the unique identifier extracted as the disambiguation metadata to the source location (geographic and network location) within the stored tenant topology to identify the source of the request. Matching the unique identifier in this way is indicated by block 288 in the flow diagram of FIG. 4. Where the disambiguation metadata includes the authentication context and LAN context information, then that disambiguation metadata is processed against the representation of the tenant topology in order to identify the source location of the request, as indicated by block 290. The disambiguation metadata can be processed to identify the source location of the request in other ways as well, as indicated by block 292.

Once the source location of the request has been disambiguated, egress traffic disambiguation system 166 outputs an indication of the disambiguated location of the source of the request (the source location) to traffic data aggregation system, as indicated by block 294. Traffic data aggregation system 110 then aggregates the disambiguated traffic data, as indicated by block 296. In one example, source data aggregation system 184 aggregates the traffic to the different locations that generate requests, as indicated by block 298. The data can be aggregated in other ways, using other aggregation criteria as well, as indicated by block 300. Traffic data processor 182 can perform any of a wide variety of different types of processing to generate metrics and/or scores (such as network latency metrics, etc.) or other data based upon the aggregated traffic data, as indicated by block 301.

Control signal generator 186 then generates one or more control signals based upon the aggregated data, as indicated by block 302 in FIG. 4. For example, control signal generator 186 can generate a control signal to control routing based upon the aggregated data. Generating a routing control signal is indicated by block 304. Control signal generator 186 can generate a control signal to provide near real time feedback to tenant computing system architecture 102, third party service provider computing system 108, or other systems, as indicated by block 306. Control signal generator 186 can generate a control signal to control communication system 187 to communicate the aggregated data, or the metrics or scores, to other systems in architecture 100, as indicated by block 308. Control signal generator 186 can generate other control signals to control other items as well, as indicated by block 310.

Figure 5:
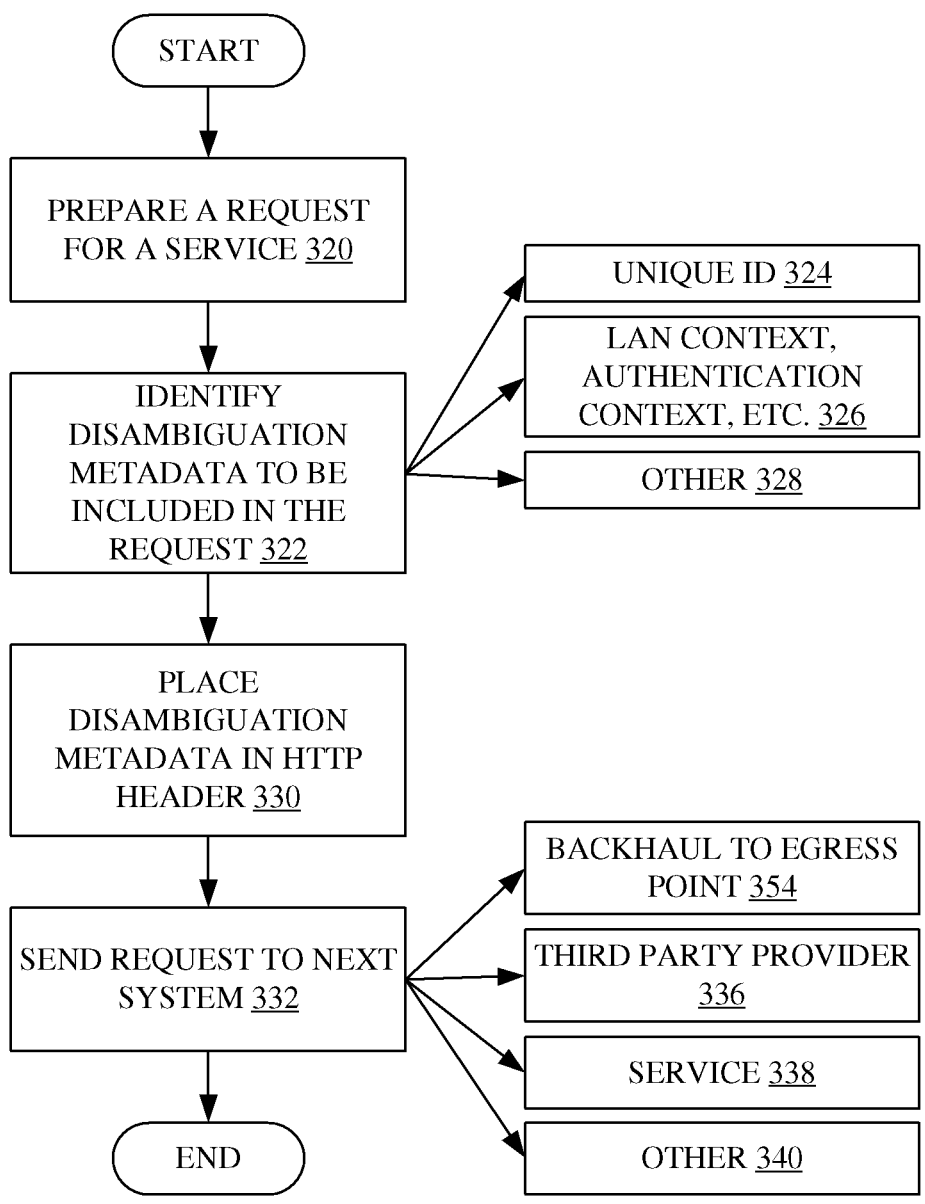
FIG. 5 is a flow diagram illustrating one example of the operation of client application functionality.

FIG. 5 is a flow diagram illustrating one example of the operation of client application functionality 146 in generating disambiguation metadata and placing it in a request for later extraction and processing by egress traffic disambiguation system 166. It is first assumed that client application functionality 146 prepares a request for a service, such as based on a user input, or based on an input from another system. Preparing a request that will be sent to service computing system 106 is indicated by block 320 in the flow diagram of FIG. 5.

Then, depending upon the type of disambiguation metadata to be included in the request, client application functionality 146 identifies that metadata, as indicated by block 322. For instance, unique ID component 197 can identify the unique identifier that has been assigned to the source of the request, as indicated by block 324. Where other metadata is to be included, then LAN context identifier 189 identifies the LAN context metadata (such as the LAN subnet address and/or the gateway device MAC address, etc.) and authentication context identifier 195 identifies the authentication context to be included as the disambiguation metadata. Identifying the LAN context and authentication context as disambiguation metadata is indicated by block 326 in the flow diagram of FIG. 5. The disambiguation metadata can be identified in other ways as well, as indicated by block 328.

Metadata insertion component 196 then places the disambiguation metadata in the request, such as in the http header or elsewhere, as indicated by block 330 in the flow diagram of FIG. 5. Client application functionality 146 then sends the request to the next system, as indicated by block 332. In one example, the request is backhauled to another egress point, such as one of the regional data centers 120-122, or to another subnetwork in tenant computing system architecture 102. Backhauling the request within the tenant architecture is indicated by block 334 in the flow diagram of FIG. 5. The request can also be sent to a third party service provider computing system 108, as indicated by block 336, or to the service where the request is to be processed, as indicated by block 338. The request can be sent to another system in other ways as well, as indicated by block 340.

It can thus be seen that the present system uses client computing system functionality to identify disambiguation metadata that can be used to disambiguate the source location of a service request for traffic analysis and control. The disambiguation metadata can be compared against an indication of tenant topology to identify a source subnetwork within a tenant, even of a very complicated topology, where the request originated. The metadata can be used to disambiguate the source of the request even where the request is first routed to a third party service provider for processing, and regardless of how many network hops the request takes in reaching the destination service. The disambiguation metadata can include such things as authentication context and LAN context. The disambiguation metadata can also be a unique identifier which is assigned ahead of time and placed in each request. The disambiguated source location of a request can be provided to a traffic aggregation system which can aggregate the request information to the source location and generate metrics and performance measures which can be used to generate control signals to improve computing system performance.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. The processors and servers are functional parts of the systems or devices to which they belong and are activated by, and facilitate, the functionality of the other components or items in those systems.

Also, a number of user interface displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, they can be actuated using touch gestures. Also, where the device that displays the mechanism has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
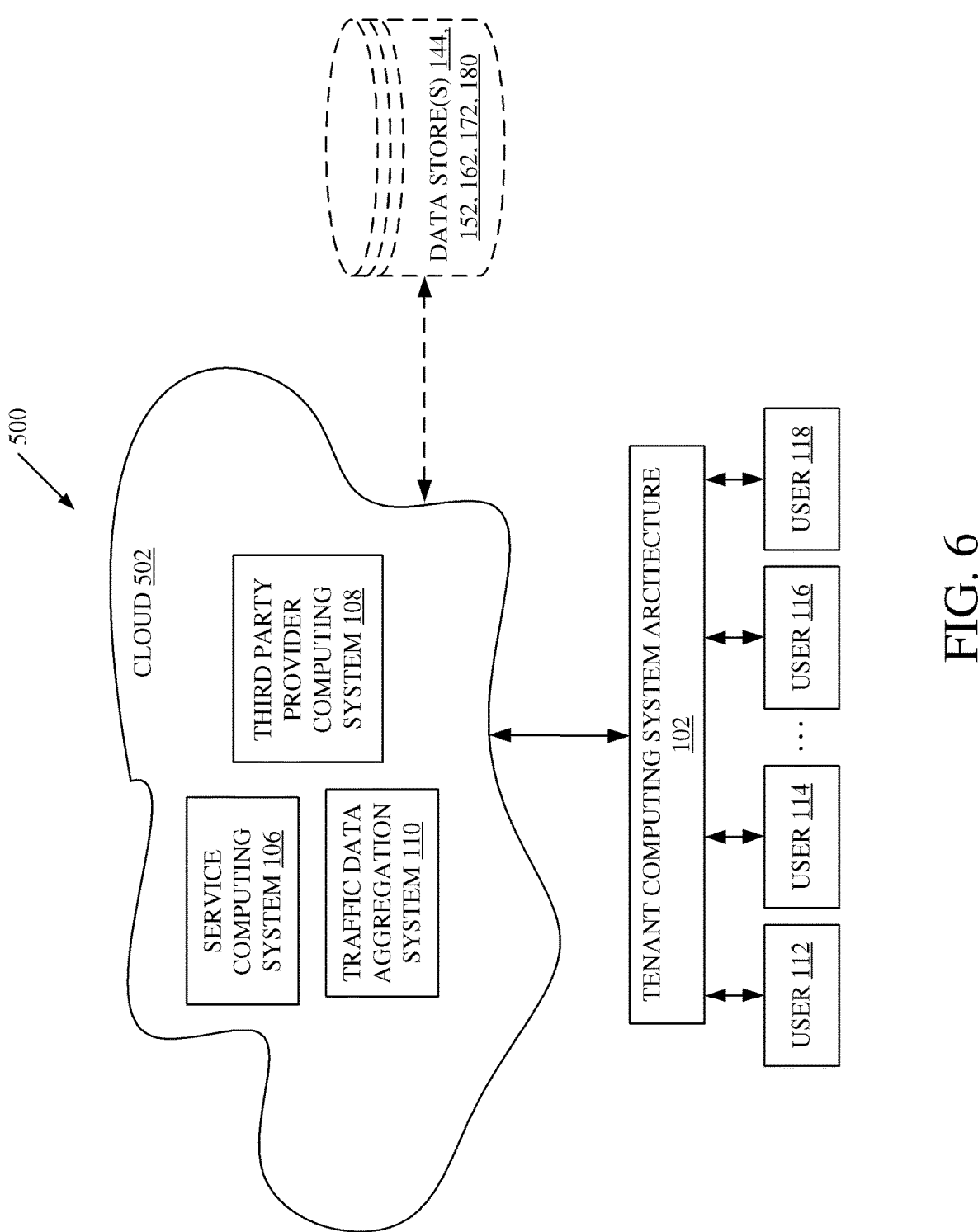
FIG. 6 is a block diagram showing one example of the architecture illustrated in FIG. 1, deployed in a remote server environment (e.g., a cloud architecture).

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, the components and functions can be provided from a conventional server, or the components and functions can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that systems 106, 108 and 110 can be located in cloud 502 (which can be public, private, or a combination where portions are public while others are private).

FIG. 6 also depicts another example of a cloud architecture. FIG. 6 shows that it is also contemplated that some elements of computing system 102 can be disposed in cloud 502 while others are not. By way of example, data stores 144, 152, 162, 172, 180 can be disposed outside of cloud 502, and accessed through cloud 502. Regardless of where the items are located, the items can be accessed directly by the systems, through a network (either a wide area network or a local area network), the items can be hosted at a remote site by a service, or the items can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
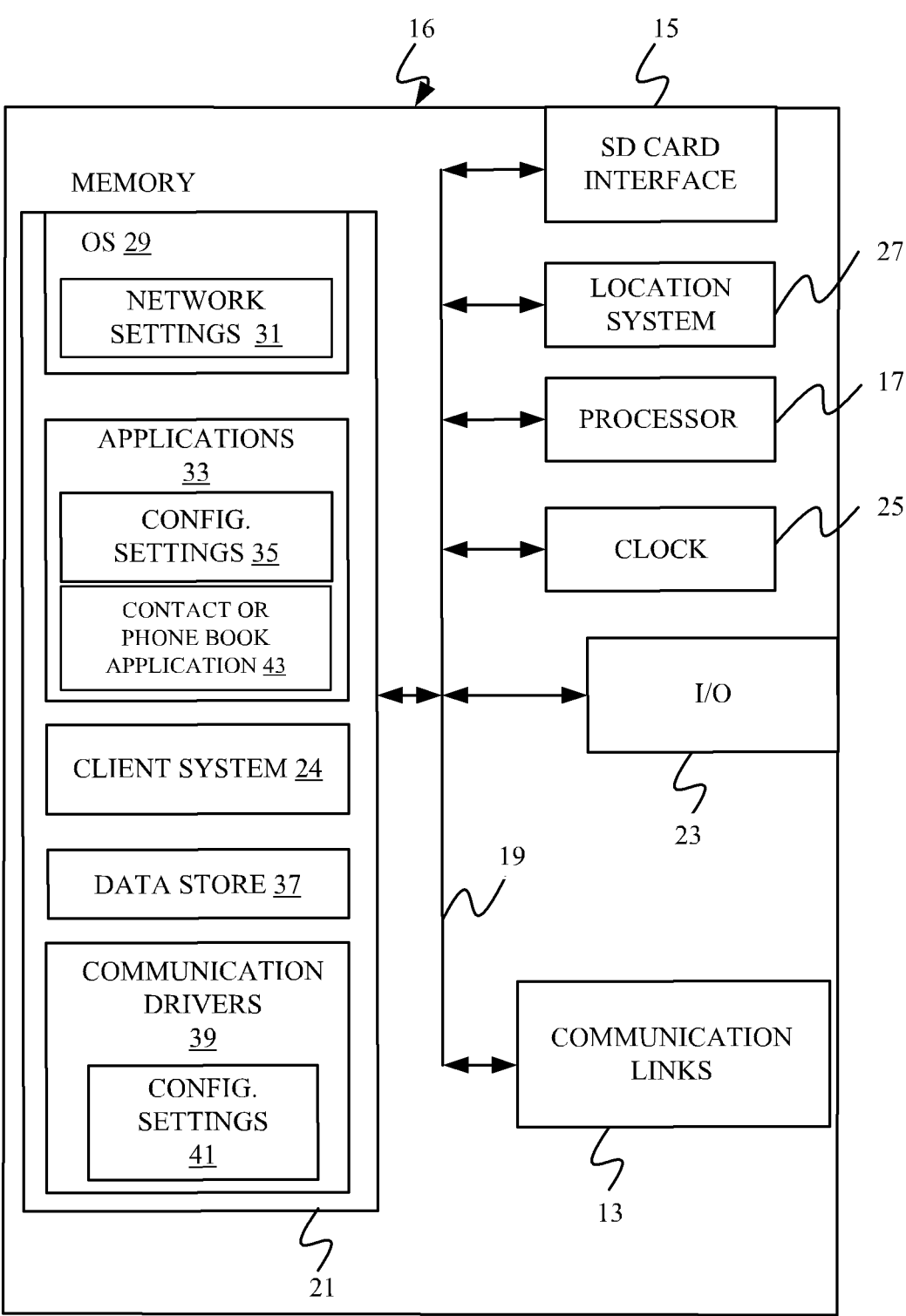
FIGS. 7, 8, and 9 show examples of mobile devices.
Figure 8:
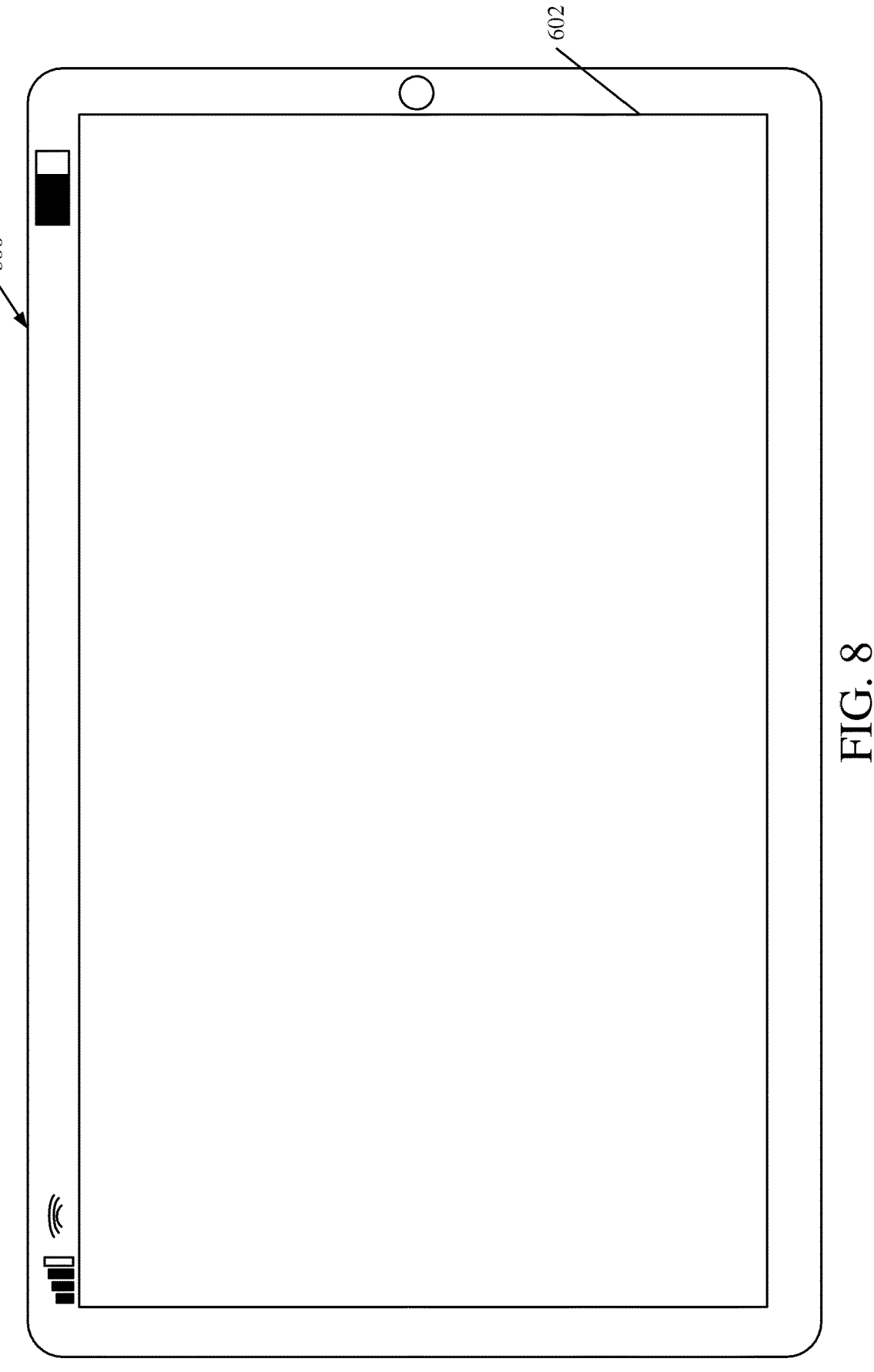
Figure 9:
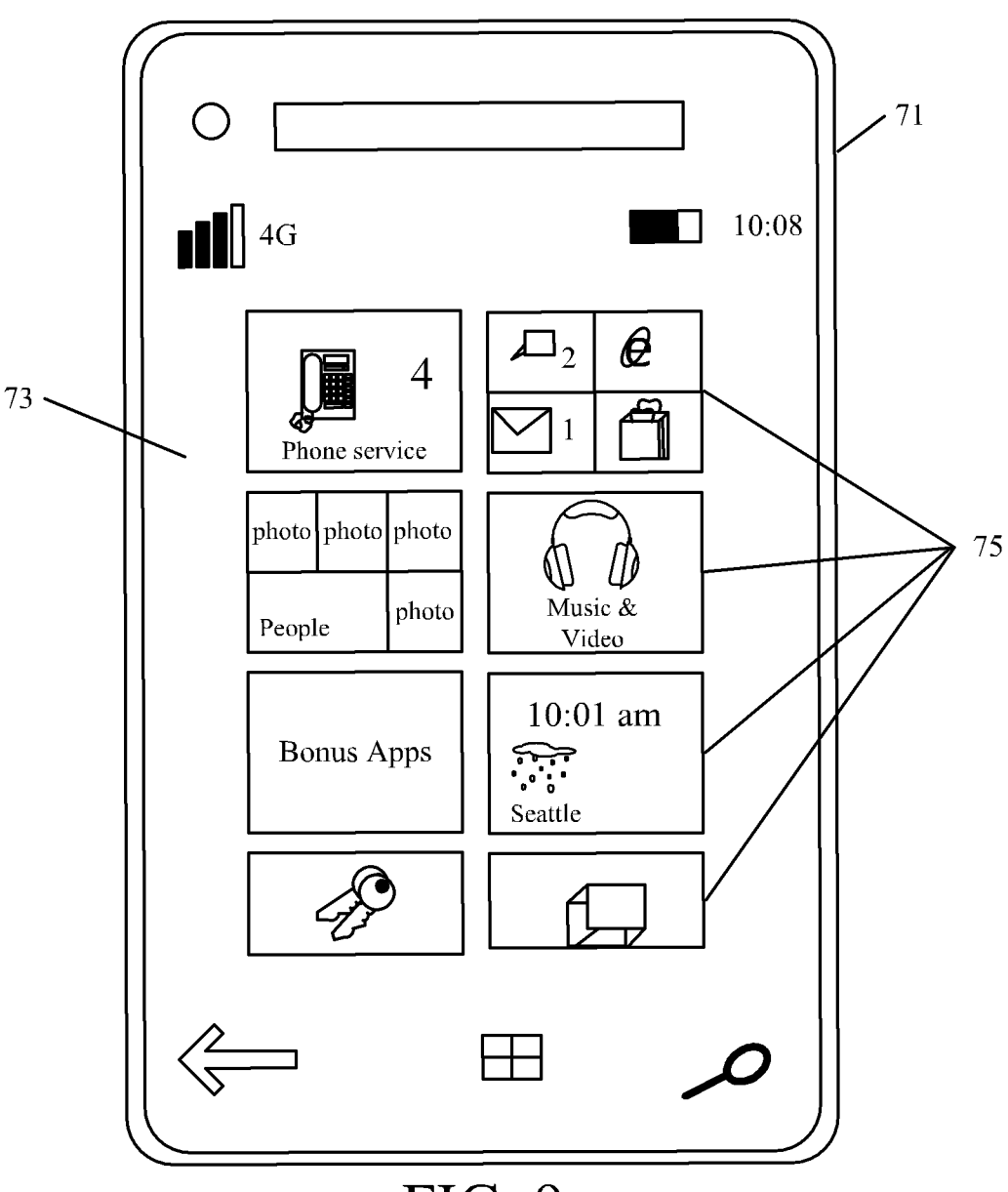

FIG. 7 is a simplified block diagram of one illustrative example of a handheld or mobile computing device that can be used as a user's or client's hand held device 16, in which the present system (or parts of it) can be deployed. FIGS. 8-9 are examples of handheld or mobile devices.

FIG. 7 provides a general block diagram of the components of a client device 16 that can run components of architecture 100, or user computing systems 130-138, or that interacts with architecture 100, or both. In the device 16, a communications link 13 is provided that allows the handheld device to communicate with other computing devices and in some examples provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1 Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 8 shows one example in which device 16 is a tablet computer 600. In FIG. 8, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
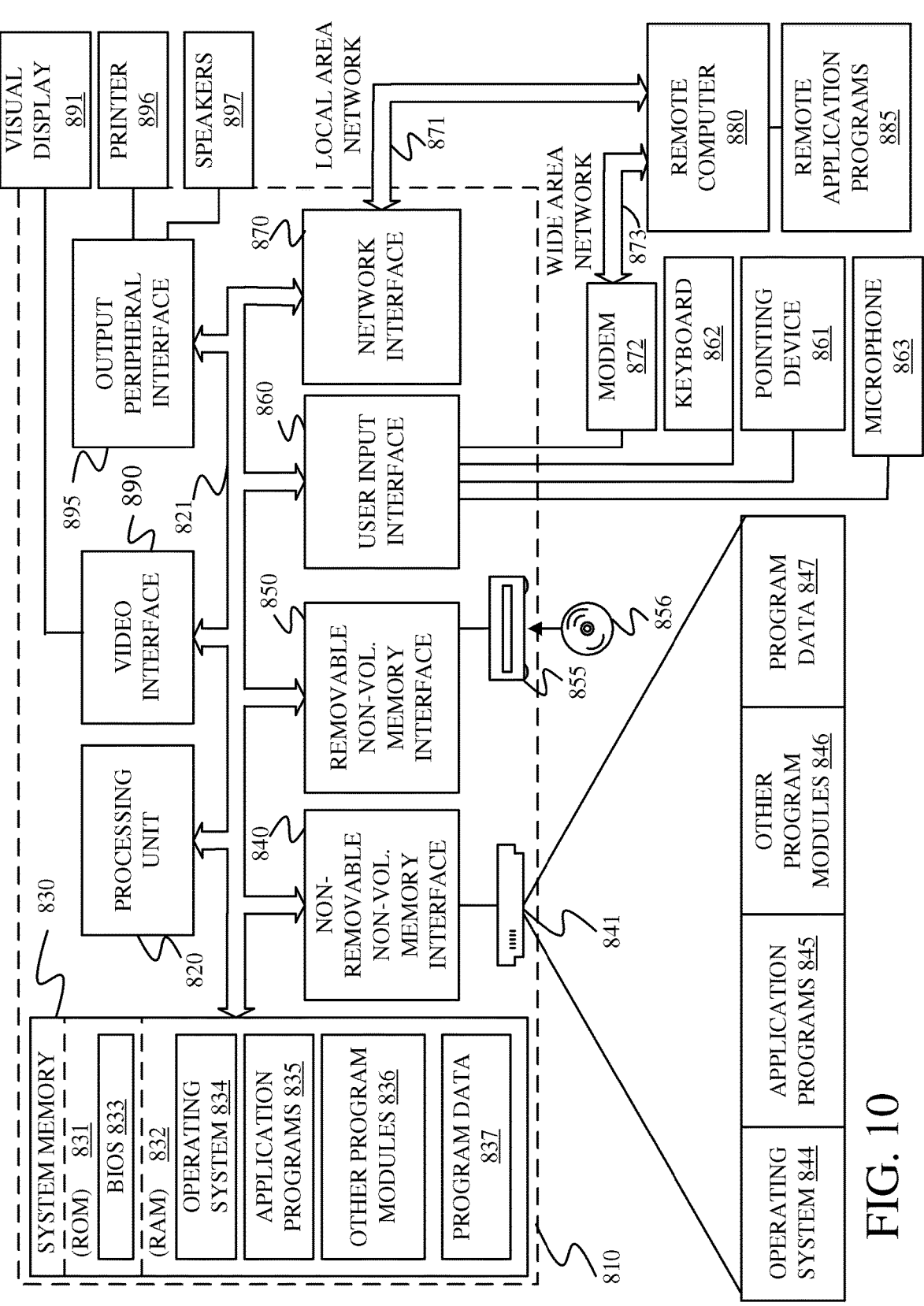
FIG. 10 is a block diagram showing one example of a computing environment.

FIG. 10 is one example of a computing environment in which architecture 100, or parts of it, (for example) can be deployed. With reference to FIG. 10, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are example and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:

at least one processor;

a data store that stores computer executable instructions which, when executed by the at least one processor, causes the at least one processor to perform steps, comprising:

receiving a request at a service computing system;

obtaining disambiguation metadata corresponding to the request;

identifying a source computing system location, at which a source computing system is located, at which the request was generated based on the disambiguation metadata and based on a representation of a tenant topology indicative of a topology of a tenant computing system architecture; and outputting the source computing system location for aggregation.

Example 2 is the computing system of any or all previous examples wherein the computer executable instructions, when executed by the at least one processor, causes the at least one processor to perform steps, further comprising:

aggregating the source computing system location to obtain aggregated data; and generating a control signal based on the aggregated data.

Example 3 is the computing system of any or all previous examples wherein the computer executable instructions, when executed by the at least one processor, causes the at least one processor to perform steps, further comprising:

prior to receiving the request, receiving a unique identifier request from the source computing system for a unique identifier; and providing the unique identifier to the source computing system, uniquely identifying the source computing system.

Example 4 is the computing system of any or all previous examples wherein obtaining the disambiguation metadata comprises:

obtaining, as the disambiguation metadata, the unique identifier.

Example 5 is the computing system of any or all previous examples wherein identifying the source computing system location comprises:

comparing the unique identifier against unique identifiers in the representation of the tenant topology to identify the source computing system location.

Example 6 is the computing system of any or all previous examples wherein obtaining disambiguation metadata comprises:

obtaining, as the disambiguation metadata, local area network (LAN) context information.

Example 7 is the computing system of any or all previous examples wherein obtaining the LAN context information comprises:

obtaining at least one of a LAN subnet internet protocol (IP) address indicative of an IP address of a LAN subnetwork in the tenant topology, or a default gateway device media access control (MAC) address.

Example 8 is the computing system of any or all previous examples wherein obtaining disambiguation metadata comprises:

obtaining authentication context information corresponding to an authorization token used by the source computing system.

Example 9 is the computing system of any or all previous examples wherein obtaining the disambiguation metadata comprises:

obtaining the disambiguation metadata from a metadata location corresponding to the request.

Example 10 is a computer implemented method, comprising:

receiving a request at a service computing system;

obtaining disambiguation metadata corresponding to the request;

identifying a source computing system location, at which a source computing system is located, at which the request was generated based on the disambiguation metadata and based on a representation of a tenant topology indicative of a topology of a tenant computing system architecture; and outputting the source computing system location for aggregation.

Example 11 is the computer implemented method of any or all previous examples, further comprising:

aggregating the source computing system location to obtain aggregated data; and generating a control signal based on the aggregated data.

Example 12 is the computer implemented method of any or all previous examples, further comprising:

prior to receiving the request, receiving a unique identifier request from the source computing system for a unique identifier; and providing the unique identifier to the source computing system, uniquely identifying the source computing system.

Example 13 is the computer implemented method of any or all previous examples wherein obtaining the disambiguation metadata comprises:

obtaining, as the disambiguation metadata, the unique identifier from the request.

Example 14 is the computer implemented method of any or all previous examples wherein identifying the source computing system location comprises:

comparing the unique identifier against unique identifiers in the representation of the tenant topology to identify the source computing system location.

Example 15 is the computer implemented method of any or all previous examples wherein obtaining disambiguation metadata comprises:

obtaining, as the disambiguation metadata, local area network (LAN) context information.

Example 16 is the computer implemented method of any or all previous examples wherein obtaining the LAN context information comprises:

obtaining at least one of a LAN subnet internet protocol (IP) address indicative of an IP address of a LAN subnetwork in the tenant topology, and a default gateway device media access control (MAC) address.

Example 17 is the computer implemented method of any or all previous examples wherein obtaining disambiguation metadata comprises:

obtaining authentication context information corresponding to an authorization token used by the source computing system.

Example 18 is the computer implemented method of any or all previous examples wherein obtaining the disambiguation metadata comprises:

obtaining the disambiguation metadata from a metadata source corresponding to the request.

Example 19 is a computer implemented method, comprising:

generating a request at a client computing system for a service computing system;

identifying disambiguation metadata indicative of a location of the client computing system;

adding a representation of the disambiguation metadata to the request; and sending the request to another computing system.

Example 20 is the computer implemented method of any or all previous examples wherein identifying disambiguation metadata comprises:

identifying at least one of local area network (LAN) context information and authentication context information, the LAN context information comprising at least one of a LAN subnet internet protocol (IP) address indicative of an IP address of a LAN subnetwork in the tenant topology, or a default gateway device media access control (MAC) address, the authentication context information corresponding to an authorization token used by the source computing system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:

at least one processor;

a data store that stores computer executable instructions which, when executed by the at least one processor, causes the at least one processor to perform steps, comprising:

receiving a unique identifier request from a source computing system for a unique identifier and providing the unique identifier to the source computing system, uniquely identifying the source computing system;

receiving a request at a service computing system, the request generated based on disambiguation metadata including the unique identifier;

obtaining disambiguation metadata corresponding to the request;

identifying a source computing system location, at which the source computing system is located, at which the request was generated based on a representation of a tenant topology indicative of a topology of a tenant computing system architecture, the representation indicating network locations of subnetworks within the tenant computing system architecture; and outputting the source computing system location for aggregation, wherein identifying the source computing system location comprises:

comparing the unique identifier against unique identifiers in the representation of the tenant topology to identify the source computing system location; and comparing an IP address from the disambiguation metadata against the tenant topology to identify a subnetwork location within the tenant computing system architecture corresponding to the IP address.

2. The computing system of claim 1 wherein the computer executable instructions, when executed by the at least one processor, causes the at least one processor to perform steps, further comprising:

aggregating the source computing system location to obtain aggregated data; and generating a control signal based on the aggregated data.

3. The computing system of claim 1 wherein obtaining disambiguation metadata comprises:

obtaining, as the disambiguation metadata, local area network (LAN) context information.

4. The computing system of claim 3 wherein obtaining the LAN context information comprises:

obtaining at least one of a LAN subnet internet protocol (IP) address indicative of an IP address of a LAN subnetwork in the tenant topology, or a default gateway device media access control (MAC) address.

5. The computing system of claim 1 wherein obtaining disambiguation metadata comprises:

obtaining authentication context information corresponding to an authorization token used by the source computing system.

6. The computing system of claim 1 wherein obtaining the disambiguation metadata comprises:

obtaining the disambiguation metadata from a metadata location corresponding to the request.

7. A computer implemented method, comprising:

receiving a unique identifier request from a source computing system for a unique identifier and providing the unique identifier to the source computing system, uniquely identifying the source computing system;

receiving a request at a service computing system, the request generated based on disambiguation metadata including the unique identifier;

obtaining disambiguation metadata corresponding to the request;

identifying a source computing system location, at which the source computing system is located, at which the request was generated based on a representation of a tenant topology indicative of a topology of a tenant computing system architecture, the representation indicating network locations of subnetworks within the tenant computing system architecture; and outputting the source computing system location for aggregation, wherein identifying the source computing system location comprises:

comparing the unique identifier against unique identifiers in the representation of the tenant topology to identify the source computing system location; and comparing an IP address from the disambiguation metadata against the tenant topology to identify a subnetwork location within the tenant computing system architecture corresponding to the IP address.

8. The computer implemented method of claim 7, further comprising:

aggregating the source computing system location to obtain aggregated data; and generating a control signal based on the aggregated data.

9. The computer implemented method of claim 7 wherein obtaining disambiguation metadata comprises:

obtaining, as the disambiguation metadata, local area network (LAN) context information.

10. The computer implemented method of claim 9 wherein obtaining the LAN context information comprises:

obtaining at least one of a LAN subnet internet protocol (IP) address indicative of an IP address of a LAN subnetwork in the tenant topology, or a default gateway device media access control (MAC) address.

11. The computer implemented method of claim 7 wherein obtaining disambiguation metadata comprises:

obtaining authentication context information corresponding to an authorization token used by the source computing system.

12. The computer implemented method of claim 7 wherein obtaining the disambiguation metadata comprises:

obtaining the disambiguation metadata from a metadata source corresponding to the request.

13. A computer implemented method, comprising:

generating a unique identifier request at a client computing system for a unique identifier and providing the unique identifier to a source computing system, uniquely identifying the source computing system;

generating a request at the client computing system for a service computing system, the request generated based on disambiguation metadata including the unique identifier;

identifying disambiguation metadata indicative of a location of the client computing system;

adding a representation of the disambiguation metadata to the request, the representation indicating network locations of subnetworks within a tenant computing system architecture; and sending the request to another computing system.

14. The computer implemented method of claim 13 wherein identifying disambiguation metadata comprises:

identifying at least one of local area network (LAN) context information and authentication context information, the LAN context information comprising at least one of a LAN subnet internet protocol (IP) address indicative of an IP address of a LAN subnetwork in a tenant topology, or a default gateway device media access control (MAC) address, the authentication context information corresponding to an authorization token used by the source computing system.

* * * * *